US006182221B1

(12) United States Patent
Hsu et al.

(10) Patent No.: US 6,182,221 B1
(45) Date of Patent: *Jan. 30, 2001

(54) REMOTE IDENTITY VERIFICATION TECHNIQUE USING A PERSONAL IDENTIFICATION DEVICE

(75) Inventors: Shi-Ping Hsu, Pasadena, CA (US); James M. Ling, Great Falls, VA (US); Arthur F. Messenger; Bruce W. Evans, both of Redondo Beach, CA (US)

(73) Assignee: TRW Inc., Redondo Beach, CA (US)

(*) Notice: Under 35 U.S.C. 154(b), the term of this patent shall be extended for 0 days.

This patent is subject to a terminal disclaimer.

(21) Appl. No.: 09/422,919

(22) Filed: Oct. 21, 1999

Related U.S. Application Data

(63) Continuation of application No. 08/995,565, filed on Dec. 22, 1997, now Pat. No. 6,038,666.

(51) Int. Cl.[7] .............................. G06F 12/14; H04L 9/30; H04L 9/32

(52) U.S. Cl. .......................... 713/186; 713/202; 380/285

(58) Field of Search .................................... 713/185, 186, 713/202; 380/283, 285

(56) References Cited

U.S. PATENT DOCUMENTS 5,363,448 * 11/1994 Koopman, Jr. et al. ............... 380/23
5,541,994 * 7/1996 Tomko et al. ......................... 380/30
5,852,665 * 12/1998 Gressel et al. ......................... 380/30
6,016,476 * 1/2000 Maes et al. .............................. 705/1
6,041,410 * 3/2000 Hsu et al. ........................... 713/186

OTHER PUBLICATIONS

Schneier, B., "Applied Cryptography: Protocols, Algorithms, and Source Code in C," John Wiley & Sons, Oct. 18, 1995, pp. 41–44.*

* cited by examiner

*Primary Examiner*—Tod R. Swann
*Assistant Examiner*—Justin Darrow
(74) *Attorney, Agent, or Firm*—Michael S. Yatsko

(57) ABSTRACT

Apparatus, and a method for its use, for automatically verifying the identity of a person seeking access to a protected property that is remotely located with respect to the apparatus, such as a remotely located computer file or building alarm system. The apparatus, which is disclosed in the form of a handheld device (14) or other portable device (14'), includes a sensor (16) for reading biometric data, such as a fingerprint image, from the person, and a correlator (28) for comparing the sensed data with a previously stored reference image (32) and for determining whether there is a match. If there is a match, the device (14) initiates an exchange of signals over a communication network, with the "door" (10) that protects the property. Specifically, the device (14) generates a numerical value, such as a cyclic redundancy code, from the stored reference image (32), encrypts the numerical value, and transmits it to the door (10) as confirmation of the person's identity. For further security, the person registers this numerical value at each door (10) to which access is desired. Upon receipt of identity confirmation from the device (14), the door (10) compares the received numerical value with the one stored during registration, before granting access to the protected property.

14 Claims, 4 Drawing Sheets

REMOTE IDENTITY VERIFICATION TECHNIQUE USING A PERSONAL IDENTIFICATION DEVICE

This application is a continuation of U.S. application Ser. No. 08/995,565, filed Dec. 22, 1997, now U.S. Pat. No. 6,038,666.

BACKGROUND OF THE INVENTION

The present invention relates generally to personal identification or verification systems and, more particularly, to systems that automatically verify a person's identity before granting access to valuable information or granting the ability to perform various transactions remotely. Traditionally, keys and locks, or combination locks, have been used to limit access to property, on the theory that only persons with a right to access the property will have the required key or combination. This traditional approach is, of course, still widely used to limit access to a variety of enclosed spaces, including rooms, buildings, automobiles and safe deposit boxes in banks. In recent years, mechanical locks have been supplanted by electronic ones actuated by encoded plastic cards, as used, for example, for access to hotel room doors, or to bank automatic teller machines (ATMs). In the latter case, the user of the plastic card as a "key" to a bank account must also supply a personal identification number (PIN) before access is granted.

A significantly different problem is presented when someone seeks access to information remotely, such as by telephone or through some other type of communication network. Telephone verification of identity is typically accomplished using passwords, personal identification numbers (PINs), or words of which only a limited number of people have knowledge. Banks frequently use the customer's mother's maiden name as an access code, sometimes coupled with other codes or numbers theoretically known only to the customer. There are many practical shortcomings to this approach, the most obvious of which is that any of these codes or secret words can be stolen, lost or fall into the wrong hands by other means. Security may be increased by encoding identity data into magnetic stripes on plastic identification cards, which are used in conjunction with telephones that have appropriate card readers. The use of "smart cards" containing even more information on an integrated-circuit TRW chip has also been proposed, but these approaches also have the drawback that the identity cards may be lost or stolen.

Accordingly, there is a widely felt need for a more reliable technique for providing secure access to information and assets, particularly for users who seek this access over a communication system of some kind. Ideally, the technique should positively verify the identity of the person seeking remote access, and should eliminate the need to carry multiple scannable cards, and the need to memorize combinations, passwords and PINs. The present invention satisfies this need.

SUMMARY OF THE INVENTION

The present invention resides in apparatus, and a method for its use, for automatically verifying the identity of a person seeking remote access to a protected property. The protected property may take a variety of forms, but typically includes a remotely located computer to which a user seeks access for reading or writing information. Alternatively, the protected property may be a building or other structure and the user wishes to activate or deactivate an alarm system in the building.

Briefly, and in general terms, the apparatus of the present invention comprises a personal identification device and means for securely communicating identity confirmation to a door that provides access to the protected property upon receipt of the identity confirmation. The personal identification device includes a sensor, for reading biometric data identifying a person seeking access to a protected property, storage means, for storing reference biometric data identifying a person authorized to have access to the protected property, and a correlator, for comparing the stored reference biometric data with the biometric data of the person seeking access and determining whether they match. The apparatus may further comprise a user interface having a first switch to initiate operation of the apparatus in a verification mode, and a second switch, actuation of which places the apparatus in an enroll mode of operation, wherein biometric data from the sensor are stored in the storage means for subsequent retrieval in the verification mode of operation.

In one of the disclosed embodiments of the invention, the sensor, the storage means and the correlator are all integrated into a portable communication device, such as a telephone, which may be a device carried by the person, or some other type of communication device remote from the protected property. In the disclosed embodiments, the means for securely communicating identity confirmation includes means for generating a numerical value from the stored reference biometric data; encryption logic, for encrypting the numerical value; and a communication interface for sending the encrypted numerical value to the door, together with identification data for the person. The door provides the desired access to the protected property upon confirming that the transmitted numerical value is the same as one previously provided by the person during a registration procedure.

The apparatus of the invention may further include a receiver, for receiving an encryption key generated by and transmitted from the door, and means for storing a private encryption key in the identification device. Further, the encryption logic in the device includes means for doubly encrypting the numerical value using the encryption key received from the door and the private encryption key.

The apparatus of the invention may also be defined as a separate device that includes a sensor, for reading fingerprint data identifying a user seeking access to a protected property; a memory for storing a reference fingerprint image of the user during an enrollment procedure and for holding the reference image for future use; an image correlator, for comparing the stored reference image with a fingerprint image of the user seeking access, as obtained from the sensor, and for determining whether the two images match; and means for securely communicating identity confirmation to a door that provides access to the protected property upon receipt of the identity confirmation. More specifically, the means for securely communicating identity confirmation includes means for generating a numerical value from the stored reference fingerprint image; encryption logic, for encrypting the numerical value; and a transmitter for sending the encrypted numerical value to the door, together with user identification data. The door provides the desired access to the protected property upon confirming that the transmitted numerical value is the same as one previously provided by the user during a registration procedure.

In the personal identification device as defined in the previous paragraph, the means for generating a numerical value includes means for generating a cyclic redundancy code from the stored reference fingerprint image. The device further includes a receiver, for receiving an encryption key generated by and transmitted from the door; and means for storing a private encryption key in the device. The encrypticn logic in the device includes means for doubly encrypting the numerical value using the encryption key received from the door and the private encryption key.

In terms of a novel method for automatically verifying the identity of user seeking access to a remotely located, protected computer, the invention comprises the steps of sensing biometric data of a user, through a sensor that is part of a personal identification device carried by the user; comparing the sensed biometric data with reference biometric data previously stored in the personal identification device; determining whether the sensed biometric data match the reference biometric data; if there is a match, securely communicating, through a communication network, an identity confirmation to a door that controls access to the protected computer; and upon confirmation of the identity of the user at the door, providing the desired access to this protected computer. The method further comprises the step of initiating normal operation of the personal identification device by means of a manual switch.

In one embodiment of the method, the step of securely communicating includes generating a numerical value from the stored reference biometric data; encrypting the numerical value; transmitting the encrypted numerical value to the door; transmitting user identification data to the door; receiving and decrypting the encrypted numerical value at the door; comparing the decrypted numerical value with one previously stored at the door by the user during a registration process, to confirm the identity of the user; and if the identity of the user is confirmed, activating a desired function to provide access to the protected property.

More specifically, the step of securely communicating further comprises the steps of generating at the door a random pair of door public and private encryption keys; transmitting the door public key to the personal identification device; selecting for the personal identification device a pair of public and private encryption keys for all subsequent uses of the device; providing the personal identification device public key to the door as part of the door registration process; and storing the personal identification device private key secretly in the device. The encrypting step includes doubly encrypting the numerical value with the door public key and the personal identification device private key. The method further includes the step, performed at the door, of decrypting the doubly encrypted numerical value using the personal identification device public key and the door private key.

The invention may also be defined as a method for a user to obtain access to a remotely located and protected computer, the method including the steps of placing a finer on a fingerprint sensor in a device; actuating the device to sense and record a fingerprint of the user; comparing the sensed fingerprint with reference fingerprint data previously stored in the device; transmitting, upon a successful comparison, an identity confirmation from the device and over a communication network to the protected computer; and providing requested access to the protected computer upon receipt of an identity confirmation. The step of transmitting an identity confirmation ideally includes encrypting the identity confirmation in the device and decrypting the identity confirmation in the protected computer. More specifically, encrypting in the device includes doubly encrypting using a public encryption key received from the protected computer and a private encryption key stored in the device, and decrypting includes doubly decrypting using a public key provided by the device user and a private encryption key generated in the computer.

It will be appreciated from the foregoing that the present invention represents a significant advance in providing secure access to remotely located computers or similar protected properties. More particularly, the invention allows multiple properties or assets to be accessed remotely using a security device, which reliably identifies its owner using biometric data, such as a fingerprint. Because identification is verified in a small portable device, communication with multiple "doors" to protected property can be limited to a simple identity confirmation message, appropriately encrypted to prevent eavesdropping or reverse engineering. Other aspects and advantages of the invention will become apparent from the following more detailed description, taken in conjunction with the accompanying drawings.

DESCRIPTION OF THE PREFERRED EMBODIMENTS

Figure 1A:
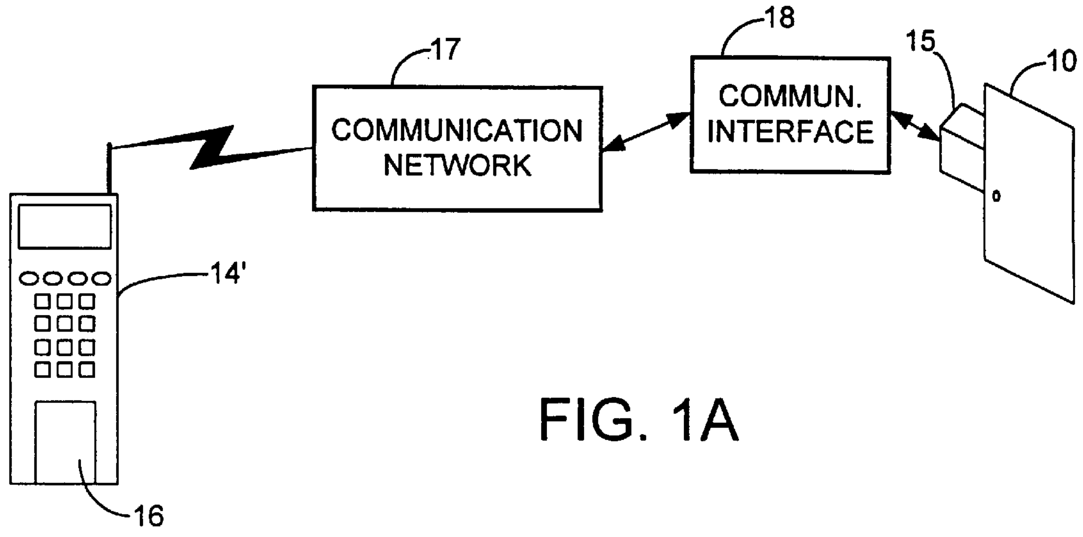
FIG. 1A is a diagram illustrating an application of the invention, wherein a personal identification device integrated into a cellular telephone is used to open a door remotely, through a communication network.

As shown in the drawings for purposes of illustration, the present invention pertains to a system for automatic verification of the identity of a person seeking remote access to protected property, over a communication network. Traditionally, remote access to protected property has been controlled with the use of passwords, codes and similar devices.

In accordance with the present invention, the person seeking access to protected property carries a portable identification device that includes a sensor capable of obtaining selected biometric measurements associated with the person, and communicating with a related device located near the "door" of the protected property. Preferably, the portable device also includes identity verification means, which compares the biometric measurements obtained from the sensor with corresponding measurements stored in a reference set of biometric measurements that were obtained from the same person during an enrollment procedure performed earlier.

Figure 1B:
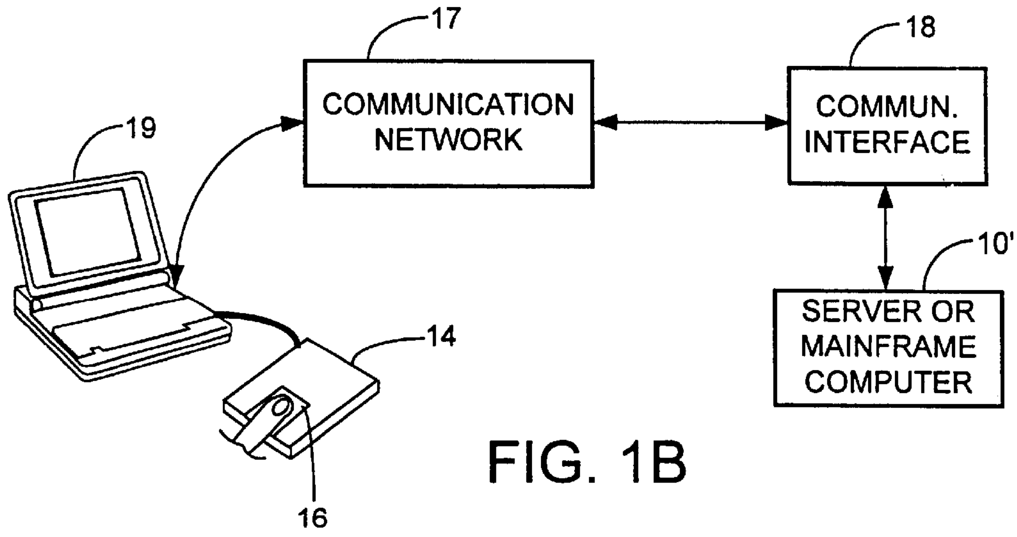
FIG. 1B is a block diagram showing the use of a personal identification device in conjunction with a portable computer, to gain access to a remotely located computer.

FIG. 1A shows diagrammatically how the invention is used to open a "door," indicated by reference numeral 10, to protected property. A person seeking entry to the door 10 carries a small handheld device, which may be integrated into a cellular telephone 14' or may take the form of a separate device 14 (FIG. 1B). It will be understood, however, that the handheld device could be integrated into other types of communication terminals. The telephone 14' communicates with a receiver 15 located near the door 10. In the presently preferred embodiment of the invention, the telephone 14' includes a biometric sensor, which, in the presently preferred embodiment of the invention, is a fingerprint sensor 16. It will be understood, however, that the principles of the invention are also applicable to a device that employs other biometric properties to identify the user, such as print patterns from other parts of the anatomy, or iris patterns of the eye.

The telephone 14' communicates with the receiver 15 through a communication network 17 and a communication interface 18 located near the door 10. The interface 18 may be, for example, a telephone. FIG. 1B shows how the fingerprint sensor 16 may be connected to a laptop computer 19. When the user wishes to access information in a remotely located computer, referred to as 10' because it embodies another form of a "door," the user connects the sensor 16 to the laptop computer 19, effects a connection to the computer 10' through the communication network 17 and communication interface 18, and then is identified by means of the sensor.

When the user places a finger over the sensor 16 and actuates a switch, the person's fingerprint is scanned and is compared with a reference fingerprint image stored in the device 14 or 14', which includes a fingerprint correlator (not shown in FIGS. 1A and 1B) for this purpose. If the comparison results in a match, the device 14/14' transmits a confirming message to the door 10, or the computer 10'. The door 10 is opened to allow access by the user 12, or the computer 10' is conditioned to permit data access by the user.

The nature of the confirming message sent to the door 10 or the computer 10' is of considerable importance, because a simple "OK" or "open" signal in a standardized format would be easy to duplicate in a "cloning" process, and unauthorized access would be a relatively simple matter. The confirming message should ideally be in the same format for different access "doors," but should be encoded or encrypted in a way that prevents its duplication and prevents reverse engineering of the device 14. Details of one technique for accomplishing these goals are provided below.

Figure 2:
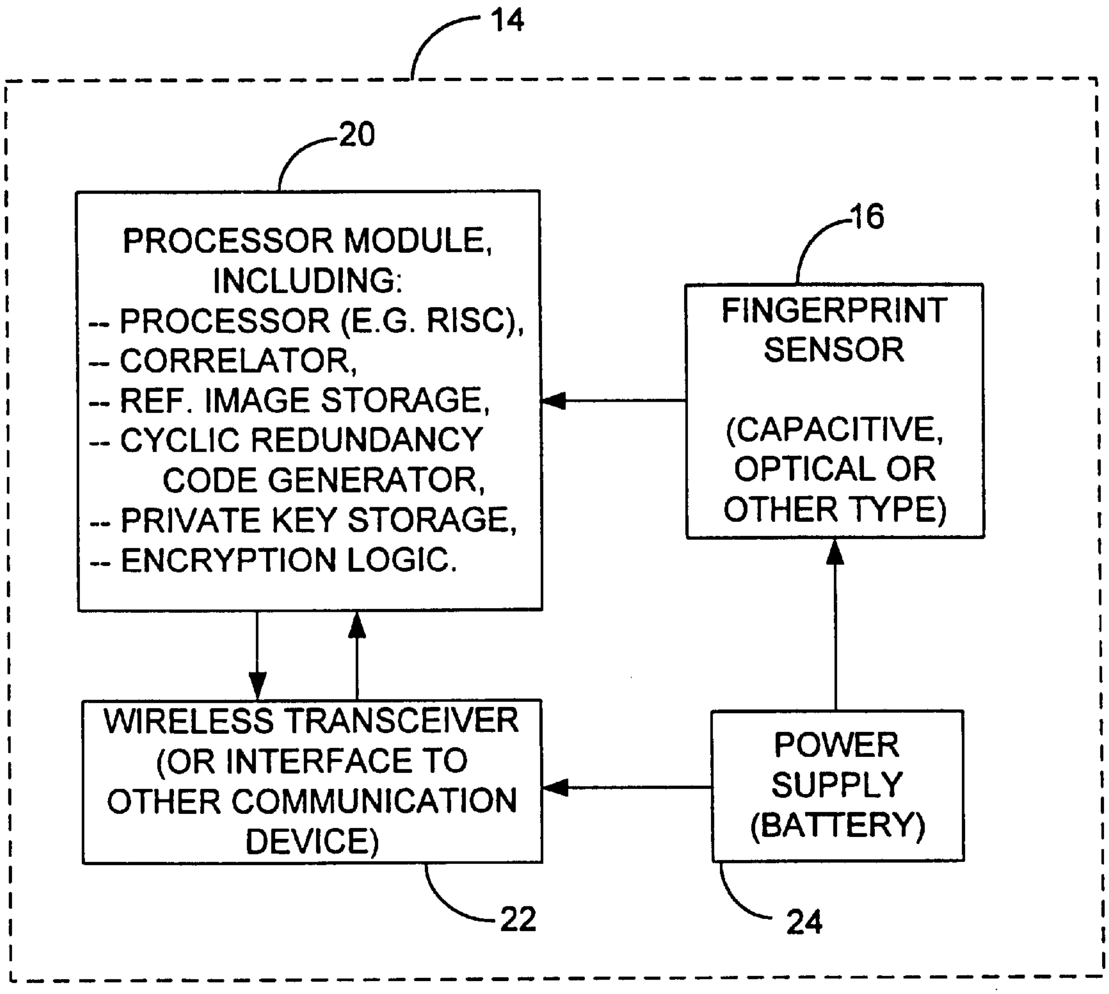
FIG. 2 is a block diagram depicting the principal components of the present invention.
Figure 3:
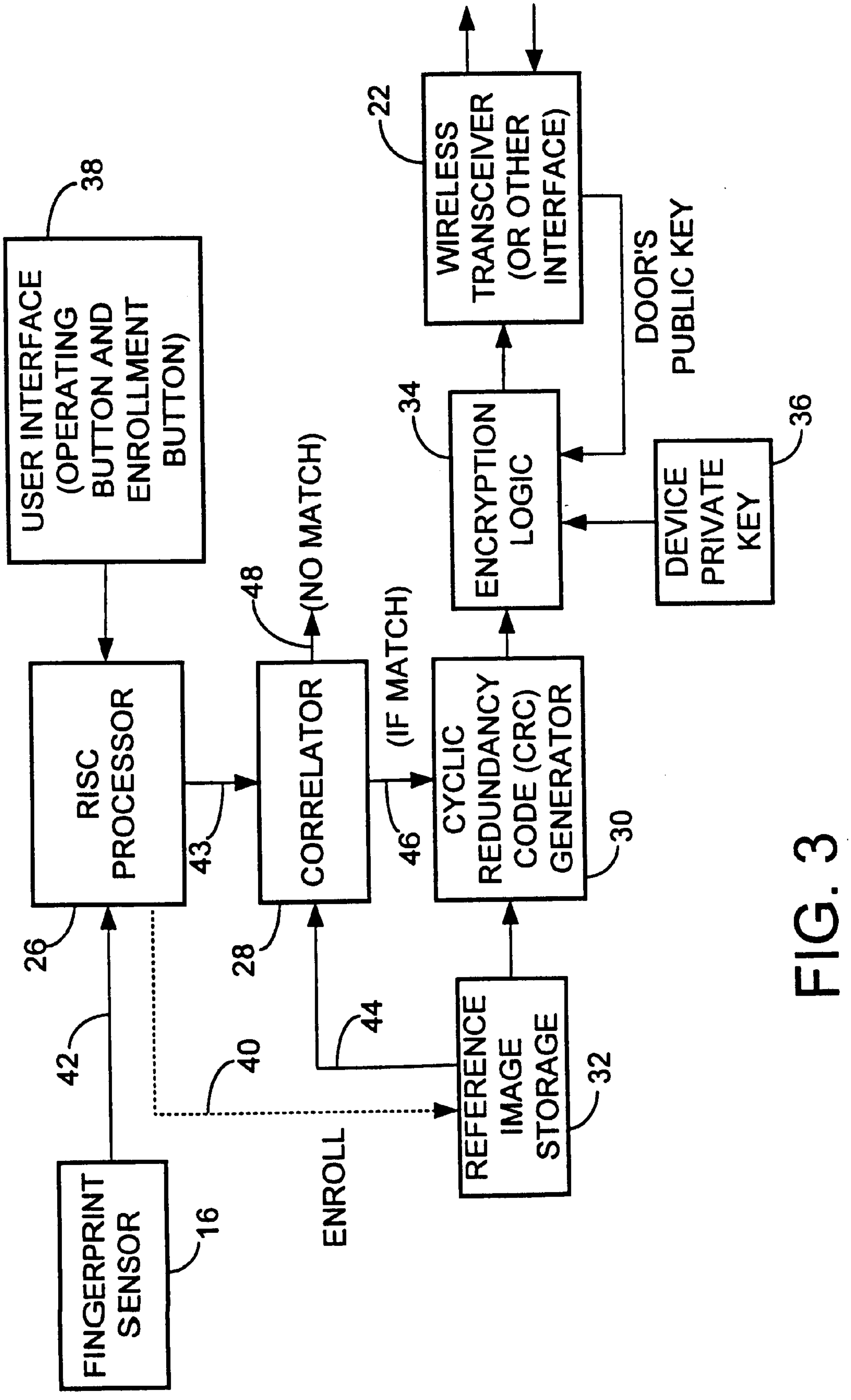
FIG. 3 is a more detailed block diagram showing the components of a processor module shown in FIG. 2.

FIG. 2 shows the principal components of the device 14, including the fingerprint sensor 16, a processor module 20, a transceiver 22 and a battery power supply 24. It will be understood that the same components may be integrated into another device, such as the cellular telephone 14', and that the battery power supply 24 may be integrated with the telephone battery. The fingerprint sensor 16 may be of any available design, and may include a capacitive, optical or other sensor. The sensor 16 produces a binary or grayscale image of a portion of the user's fingerprint. For rapid processing, the entire image may not be used in the comparison process that follows, but what the sensor 16 provides is a detailed "map" of the fingerprint, including all of its ridges and valleys. The processor module 20 is shown in more detail in FIG. 3.

The processor module 20 includes a processor 26, which may be, for example a RISC (reduced instruction set computer) processor, a fingerprint matcher, which is a feature correlator 28 in the preferred embodiment of the invention, a cyclic redundancy code (CRC) generator 30, storage 32 for a reference fingerprint image, encryption logic 34 and storage 36 for a private encryption key. The device 14 also includes a user interface 38 through which the user 12 initiates operation in various modes. Basically, the user interface 38 includes one main operating button, which may be incorporated into the fingerprint sensor 16, and at least one additional button to initiate operation in the enrollment mode. The principal function of the processor 26 is to pre-process and enhance the fingerprint image provided by the sensor 16. Pre-processing includes "cleaning" the image, cropping the image to eliminate background effects, enhancing contrast in the image, and converting the image to a more manageable binary form. In the enrollment mode, the pre-processed image is stored in the reference image storage area 32, as indicated by the broken line 40. Enrollment is performed when the user first acquires the device 14, and is normally not repeated unless the device is lost or damaged. For additional security and convenience, the user may be asked to enroll two fingerprints, to allow for continued access if the user injures a finger, for example. In a verification mode of operation, the pre-processed fingerprint image is input to the correlator 28, as indicated by line 43, where it is compared with the reference image obtained from storage 32 over line 44. The correlator 28 uses an appropriate technique to compare the images, depending on the level of security desired. Because speed of operation is an important factor, a bit-by-bit comparison of the entire images is usually not performed. Rather, significant features of the reference image are identified and the same features are looked for in the newly scanned image. The techniques disclosed in U.S. Pat. No. 5,067,162 may, for example, be incorporated into the correlator 28 for some applications of the device 14. Preferably, the fingerprint correlator 28 should follow the teachings of a co-pending patent application entitled "Fingerprint Feature Correlator," by inventors Bruce W. Evans et al., which is hereby incorporated by reference into this specification. As a result of the comparison of the images, the correlator 28 may generate a match signal on line 46, which activates the CRC generator 30. If a no-match signal is generated, as indicated on line 48, no further processing is performed. Optionally, the no-match signal on line 48 may be used to actuate an indicator on the user interface 38.

The cyclic redundancy code (CRC) generator 30, when actuated by a match signal on line 46, generates a relatively long (such as 128 bits) binary number derived from the reference image data. The CRC provides a single number that, for all practical purposes, uniquely identifies the stored reference fingerprint image. Even if two fingerprint images produced the same CRC, which is highly unlikely, the security of the system of the invention would not be compromised, as will shortly become clear.

The CRC itself is not stored in the device 14, but is transmitted in encrypted form to the door receiver 15. Before using the device 14 for access to a particular door 10 for the first time, the user 12 must first "register" at the door. The registration process is one in which an administrator of the door stores the user's name (or account number, or other identifying information), in association with a public encryption key to be used in the user's device 14, and the user's CRC as derived from the user's reference fingerprint. If the door 10 provides access to a financial institution, for example, the user will register by bringing his or her device 14 to the institution, and transmitting the fingerprint CRC from the device to the door receiver 15. In the registration mode, the door receiver 15 will store the user's CRC in association with the user's name or other identifying information. As part of the registration process, the user 12 will normally be required to present some form of identification other than the device 14, to prove to the institution that the user is, in fact, the one whose name or other identifying information is presented and will be stored in the door 10.

As will now be explained in more detail, in a subsequent use of the device 14 for access to a door 10 at which the user has registered, the device transmits a user name and the CRC corresponding to the stored reference image. Logic at the door 10 or computer 10' then compares the received CRC with the one that was stored for the named user during registration. If there is a match, the door is opened for the user.

Figure 4:
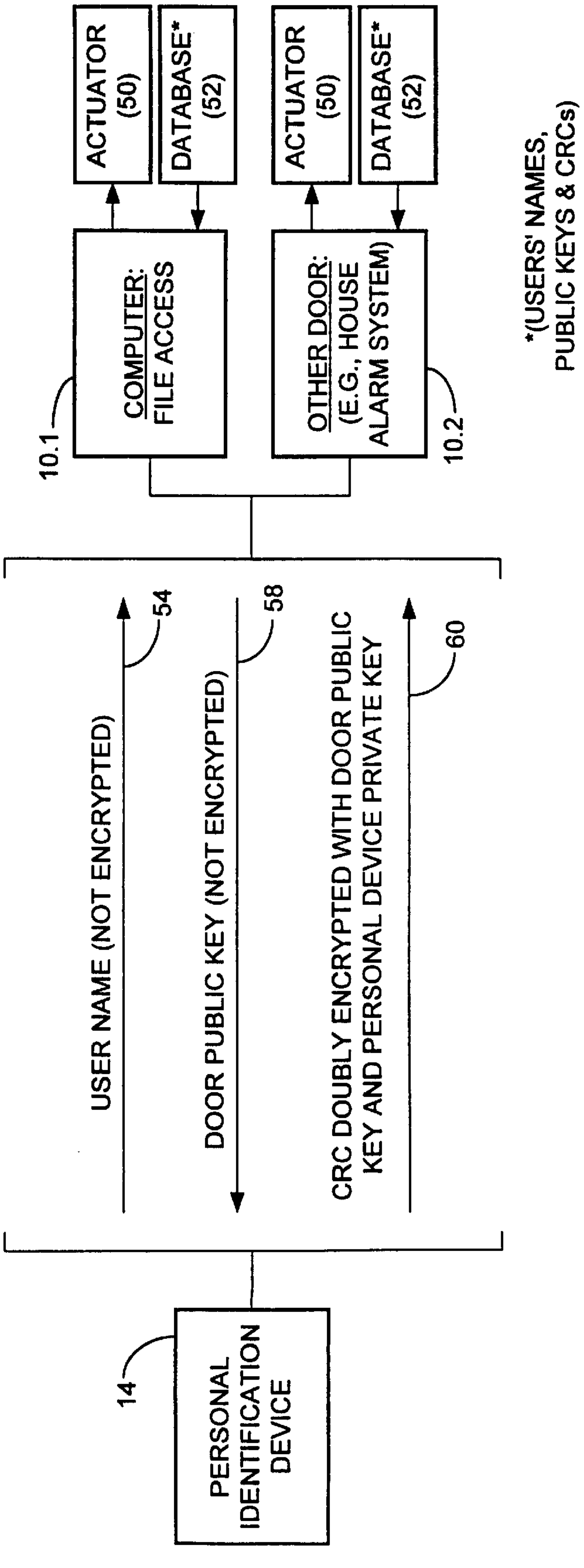
FIG. 4 is a block diagram showing a sequence of signals transmitted between the portable device and a door to protected property.

FIG. 4 shows the communications that pass between the personal identification device 14 and a door 10, two different forms of which are shown, including a computer 10.1 and another type of "door" 10.2, such as in a house or other property to which remote access is desired. Each door 10 has an actuator 50, to perform some desired operation, such as opening the door, and each door also has a database 52 in which is stored the user name, the user device public encryption key and the user CRC, for each user registered to use the door. For file access to the computer 10.1, the user may simply need to access personal data relating to a user account in bank or other institution, or may need to download information from a file in the computer. For access to the door 10.2, the user may need, for example, to make sure that an alarm system has been activated in a residence or office.

When the user actuates the device 14, the user name is transmitted to the door 10 in non-encrypted form, as indicated by line 54. On receiving the user name, the door 10 generates a random pair of public and private encryption keys to be used in the ensuing exchange of messages. Since public key encryption is used in this illustrative embodiment of the invention, a few words of explanation are called for, but it will be understood that the principles of public key encryption are well understood in the field of secure communication.

In public key encryption, two separate encryption keys are used: a "public" key (potentially known to everyone and not kept secret), and a "private" key (known to only one party in a communication from one party to another). The pair of public-private keys has the property that, if either of them is used to encrypt a message, the other one of the pair will decrypt the message. For example, party A can send a secure message to party B by first encrypting with B's public key. Only B can decrypt the message, because only B has B's private key needed for decryption. Similarly, B could send an encrypted message to A using B's private key for encryption. A could decrypt the message with B's public key, but so could anyone else, because B's public key may be known to others. Therefore, the message transmitted using this "backward" form of public key encryption would not be secure.

The illustrative embodiment of the present invention uses a double encryption form of public key encryption. Both the device 14 and the door 10 have a public-private key pair. As presently contemplated, the device 14 of the invention will have a "fixed" public and private key pair, that is to say the public and private keys will not changed from one use of the device to the next. The device public key is registered with each door 10 and it would be impractical to change it for every use. The device private key is stored (at 36, FIG. 3) in the device 14, preferably in a form in which it cannot be discerned by inspection or reverse engineering. The key may, for example, be encoded into the silicon structure of the processor module 20 in such a way that it is practically indecipherable by any normal reverse engineering technique. Each door 10 generates a new public-private key pair on every new use of the door. Thus, these keys cannot be determined in advance of the actual message exchange with a device 14.

Upon receipt of a user name from the device 14, the door 10 to which access is sought generates a random pair of public-private keys, and transmits the public key to the device without encryption, as indicated by line 58. Then, if the device 14 has validated the user's identification by successfully matching the sensed fingerprint image with the reference image, the device performs two levels of encryption on the CRC that is generated. First, the encryption logic 34 in the device 14 encrypts the CRC using the door's public key. Then the resulting encrypted CRC is doubly encrypted using the device's private key. The doubly encrypted CRC is transmitted to the door 10, where it is decrypted using the device's public key and then using the door's private key to recover the CRC. The door 10 then compares this CRC with the CRC in its database 52 associated with the user name seeking access to the door. If there is a match, the door 10 signals its actuator 50 to open the door or to perform some other desired operation.

It will be appreciated from this description that the invention provides an extremely secure technique for accessing protected property. The device 14 is designed such that is cannot initiate a door opening operation without first matching the fingerprint of the user with the stored reference image. Even if a device thief successfully re-enrolls his own fingerprint into the device, the CRCs stored in each of the doors where the rightful user is registered would prevent operation of the doors by the thief.

Someone attempting to fabricate a "cloned" device would not have the device private key, so the door would be unable to decrypt messages from the cloned device. If someone were to eavesdrop on a device transmission and try to emulate this message in a subsequent attempt to open the same door, this approach would be foiled by the door's use of a different set of keys for each transaction. Therefore, the device's encrypted message to any door will be different on each occasion.

An additional level of security may be provided by storing the CRC at the door 10 in an internally encrypted form, to prevent theft of CRCs from doors.

If the door 10 is the computer 10.1, and the user wishes to download information from the computer, this will usually require an additional exchange of messages between the device 14 and computer 10.1, to establish an appropriate level of security for the transfer of from the computer. Techniques for effecting secure data transmission may include the exchange of messages to establish a session encryption key for the transmission, or an encryption key may have been previously established for this purpose.

It will be understood from the foregoing that the present invention represents a significant advance in the field of security devices for limiting access to remotely located property. In particular, the invention allows a person to obtain access to different properties remotely, using a hand-held device that verifies its owner's identity very reliably, by means of unique biometric parameters, such as those found in a fingerprint. Moreover, the device of the invention is highly resistant to reverse engineering, "cloning" and other techniques for tampering to obtain access to the protected properties. It will also be appreciated that, although a specific embodiment of the invention has been described in detail for purposes of illustration, various modifications may be made without departing from the spirit and scope of the invention, which should not be limited except as by the appended claims.

What is claimed is:

1. A method for a user to obtain access to a remotely located and protected computer, the method including the steps of:

placing a finger on a fingerprint sensor in a personal identification device located remotely with respect to a protected computer;

actuating the device to sense and record a fingerprint of the user;

comparing, in the personal identification device, the sensed fingerprint with reference fingerprint data previously stored in the device;

upon a successful comparison, generating a numerical value that uniquely identifies the sensed fingerprint matched with the reference fingerprint, and transmitting the numerical value as an identity confirmation code from the device and over a communication network to the protected computer;

comparing, at the protected computer, the numeric value transmitted from the device with a numeric code previously stored in the computer during a registration mode of operation; and providing requested access to the protected computer upon successful comparison in the preceding step.

2. A method as defined in claim 1, wherein the step of transmitting the identity confirmation code includes:

encrypting the identity confirmation code in the device; and decrypting the identity confirmation code at the protected computer.

3. A method as defined in claim 2, wherein:

the step of encrypting includes doubly encrypting; and the step of decrypting includes doubly decrypting.

4. A method as defined in claim 3, wherein:

the step of doubly encrypting includes first encrypting the identity confirmation using a public encryption key generated in and received from the protected computer and then further encrypting using a private device encryption key stored in the device; and the step of doubly decrypting includes first decrypting using a public device encryption key provided by the user on prior registration at the computer and then decrypting using a private encryption key generated in the computer.

5. Apparatus for automatically verifying the identity of a person seeking remote access to a protected property, the apparatus comprising:

a personal identification device having a sensor, for reading biometric data identifying a person seeking access to a protected property, storage means, for storing reference biometric data identifying a person authorized to have access to the protected property, and a correlator, for comparing the stored reference biometric data with the biometric data of the person seeking access and determining whether they match, wherein the sensor, the storage means and the correlator are all contained in a portable device;

means operative upon determination of a match of biometrc data, for securely communicating an identity confirmation code through a communication network to a door, wherein the door provides access to the protected property upon receipt of the identity confirmation code; and a user interface having a first switch to initiate operation of the apparatus in a verification mode, and a second switch, actuation of which places the apparatus in an enroll mode of operation, wherein biometric data from the sensor are stored in the storage means for subsequent retrieval in the verification mode of operation, and a numerical value that uniquely identifies the stored biometric data is transmitted to the door for registration;

and wherein the means for securely communicating an identity confirmation code includes means for generating a numerical value that uniquely identifies the stored reference biometric data matching the data of the person seeking access, encryption logic, for encrypting the numerical value, and a communication interface for sending the encrypted numerical value to the door, together with identification data for the person seeking access;

wherein the door provides the desired access to the protected property upon confirming that the transmitted numerical value is the same as the one previously transmitted for the same person for registration.

6. Apparatus as defined in claim 5, wherein:

the portable device is integrated into a portable communication device.

7. Apparatus as defined in claim 5, wherein:

the portable device is connectable to a communication device.

8. Apparatus as defined in claim 5, wherein:

the protected property is a computer file stored in a computer that is remotely located with respect to the personal identification device.

9. Apparatus as defined in claim 5, and further comprising:

a receiver, for receiving an encryption key generated by and transmitted from the door; and means for storing a private encryption key in the personal identification device;

and wherein the encryption logic includes means for doubly encrypting the numerical value using the encryption key received from the door and the private encryption key.

10. A personal identification device for automatically verifying the identity of a user seeking to use the device for access to a remotely located protected property, the device comprising:

a sensor, for reading fingerprint data identifying a user seeking access to a protected property;

a memory for storing a reference fingerprint image of the user during an enrollment procedure and for holding the reference image for future use;

an image correlator, operable in a verification mode, for comparing the stored reference image with a fingerprint image of the user seeking access, as obtained from the sensor, and for determining whether the two images match;

means operable in an enrollment mode, for transmitting to a door a numerical value that uniquely identifies stored reference image of a user being enrolled; and means operable in the verification mode, for securely communicating an identity confirmation code to a door through a communication network, wherein the door provides access to the protected property upon receipt of the identity confirmation code, wherein the means for securely communicating the identity confirmation code includes means for generating a numerical value that uniquely identifies the stored reference fingerprint image matching the image of the user seeking access, encryption logic, for encrypting the numerical value, and a transmitter for sending the encrypted numerical value to the door, together with user identification data;

wherein the door provides the desired access to the protected property upon confirming that the transmitted numerical value is the same as one previously provided by the user during enrollment.

11. A personal identification device as defined in claim 10, and further comprising:

a receiver, for receiving an encryption key generated by and transmitted from the door through the communication network; and means for storing a private encryption key in the device;

and wherein the encryption logic includes means for doubly encrypting the numerical value using the encryption key received from the door and the private encryption key.

12. A method for automatically verifying the identity of a user seeking access to a remotely located, protected computer, the method comprising the steps of:

sensing biometric data of a user, through a sensor that is part of a personal identification device carried by the user;

initiating verification operation of the personal identification device by means of a manual switch;

comparing the sensed biometric data with reference biometric data previously stored in the personal identification device;

determining whether the sensed biometric data match the reference biometric data;

if there is a match, securely communicating, through a communication network, an identity confirmation code to a door that controls access to the protected computer; wherein the step of securely communicating an identity confirmation code includes generating a numerical value from the stored reference biometric data, encrypting the numerical value, transmitting the encrypted numerical value over the communication network to the door, transmitting user identification data over the communication network to the door, and receiving and decrypting the encrypted numerical value, at the door;

comparing the decrypted numerical value with one previously stored at the door by the user during a registration process, to confirm the identity of the user; and if the identity of the user is confirmed, activating a desired function to provide the desired access to the protected computer.

13. A method as defined in claim 12, wherein the step of securely communicating further comprises:

generating at the door a random pair of door public and private encryption keys;

transmitting the door public key to the personal identification device;

selecting for the personal identification device a pair of public and private encryption keys for all subsequent uses of the device;

providing the personal identification device public key to the door as part of the door registration process; and storing the personal identification device private key secretly in the device;

and wherein the encrypting step includes doubly encrypting the numerical value with the door public key and the personal identification device private key.

14. A method as defined in claim 13, wherein door performs the additional step of:

decrypting the doubly encrypted numerical value using the personal identification device public key and the door private key.

* * * * *